(12) United States Patent
Lee et al.

(10) Patent No.: US 7,548,769 B2
(45) Date of Patent: Jun. 16, 2009

(54) SLIDING DEVICE

(75) Inventors: Feng-Chi Lee, Taipei Hsien (TW);
Chih-Hung Chan, Taipei Hsien (TW);
Shu-Fang Li, Taipei Hsien (TW)

(73) Assignee: **Cheng Uei Precision Industry Co.,
Ltd.**, Taipei Hsien (TW)

( * ) Notice: Subject to any disclaimer, the term of this patent is extended or adjusted under 35 U.S.C. 154(b) by 535 days.

(21) Appl. No.: 11/461,835

(22) Filed: Aug. 2, 2006

(65) Prior Publication Data
US 2008/0028572 A1 Feb. 7, 2008

(51) Int. Cl.
*H04M 1/00* (2006.01)
(52) U.S. Cl. .................................... 455/575.1
(58) Field of Classification Search ... 455/575.1–575.4, 455/95; 292/163; 312/334.11
See application file for complete search history.

(56) References Cited
U.S. PATENT DOCUMENTS

2005/0215298 A1* 9/2005 Lee ......................... 455/575.4
2005/0288076 A1* 12/2005 Seol ........................ 455/575.4
2006/0068859 A1* 3/2006 Lee et al. ................. 455/575.4
2007/0052334 A1* 3/2007 Chen ...................... 312/334.11
2007/0155447 A1* 7/2007 Gordecki ................. 455/575.4
2009/0008947 A1* 1/2009 Chien et al. ................. 292/163

* cited by examiner

*Primary Examiner*—Diane Mizrahi
(74) *Attorney, Agent, or Firm*—WPAT, P.C.; Anthony King

(57) ABSTRACT

A sliding device configured in a portable electrical apparatus includes a main base fixed to a main housing of the portable electrical apparatus, a sliding base fixed to a sub-housing of the portable electrical apparatus, a guiding portion coupled to the main base and the sliding base for limiting a sliding range and an elastic module arranged between the main base and the sliding base. The elastic module includes a first rotator located on the sliding base, a second rotator located on the main base, a sliding bar passed through a compression spring and arranged between the first rotator and the second rotator. When the sub-housing slides on the main housing to achieve a critical level, the sliding force accumulated in the compression spring is maximized. Therefore the sub-housing is advanced by sliding force released from the compression spring.

7 Claims, 6 Drawing Sheets

SLIDING DEVICE

BACKGROUND OF THE INVENTION

1. Field of the Invention

The invention relates to a sliding device, and particularly to a sliding device configured in a portable electrical apparatus capable of allowing a sub-housing of the portable electrical apparatus sliding on a main housing of the portable electrical apparatus.

2. The Related Art

According to the current development of communication technology, portable electrical apparatuses such as mobile phones and personal digital assistants etc, are capable of providing wireless communication. One kind of portable electrical apparatuses is a sliding-type portable electrical apparatus. The sliding-type portable apparatus has a sliding device configured therein capable of allowing a sub-housing sliding on a main housing of the portable electrical apparatus. In consideration of carrying and downsizing issues, the sub-housing slides above the main housing to an open position for using. Otherwise, the sub-housing slides to cover the main housing of the portable electrical apparatus to a close position for an idle or standby situation.

A detailed sliding device adapted for portable electrical apparatuses is disclosed in United States Patent Application Publication No. 2006/0068859 (herein incorporated by reference in its entirety). It shows the sliding device includes a first housing, a second housing and a driving unit. The driving unit includes a motor and a gear box connected to the motor. A slide cam is connected to the gear box and an elastic member is contained in the slide cam. A guide cam is contained the slide cam and the elastic member, and connected the gear box. A housing receives the motor, the gear box, the slide cam, the elastic member and the guide cam. A pinion is connected to the guide cam.

A first hinge coupled to the first housing has a rack gear meshed with the pinion and a travel-enlarging member connected to the rack gear. A second hinge coupled to the second housing has a contact member protruded therefrom to contact the travel-enlarging member. Rotation of the pinion in response to the driving force of the driving unit is converted into a linear movement of the rack gear, and a distance of the linear movement of the rack gear is enlarged by means of the travel-enlarging member, so that the second housing coupled to the second hinge is slid on the first housing coupled to the first hinge.

However, the above described structure of the sliding device is much complicated to deploy because the operation must cooperate the first hinge, the second hinge and the driving unit all together. Furthermore, the volume of the mechanism is large because of the utilized motor.

SUMMARY OF THE INVENTION

An objective of the present invention is to provide a sliding device configured in a portable electrical apparatus capable of allowing a sub-housing of the portable electronic apparatus sliding on a main housing of the portable electronic apparatus.

According to the invention, the sliding device has a main base fixed to the main housing of the portable electrical apparatus, a sliding base fixed to the sub-housing of the portable electrical apparatus. A guiding portion is coupled to the main base and the sliding base for determining a sliding range of the sliding base sliding on the main base. An elastic module is arranged between the main base and the sliding base for providing sliding force. The elastic module comprises a first rotator coupled to the sliding base, a second rotator coupled to the main base, a sliding bar passed through a compression spring and arranged between the first rotator and the second rotator, which capable of sliding to the second rotator. When the sub-housing slides on the main housing to achieve a critical level, a distance between the first rotator and the second rotator is shortest and the sliding force accumulated in the compression spring is therefore maximized. In this case, the sub-housing will be advanced by the sliding force released from the compression spring.

Another objective of the present invention is to provide a sliding device having simple structure and little volume.

According to the invention, the guiding portion has a guiding arm projected from two opposite sides of the main base, a guiding bar arranged at the two opposite sides of the sliding base. The guiding bar is passed through a curve portion of the guiding arm. When the sub-housing slides on the main housing, the sliding bar slides to the sliding arm. So the operation of the sliding device only cooperate both the guiding portion and the elastic module. Furthermore, the sliding device has little volume because of the compression module and the guiding portion are arranged between the main base and the sliding base.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
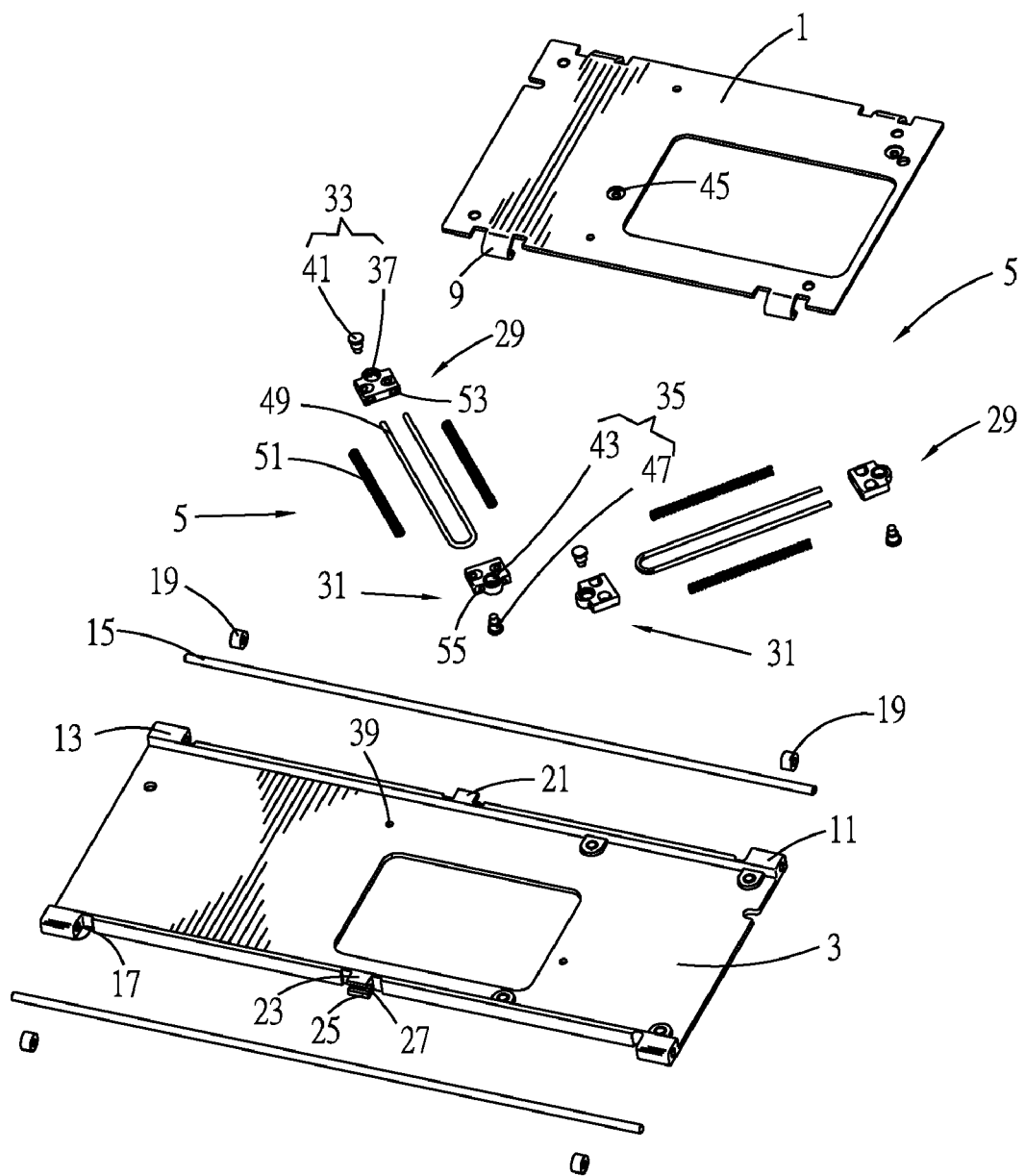
FIG. 1 shows an exploded view of a sliding device according to the present invention.
Figure 2:
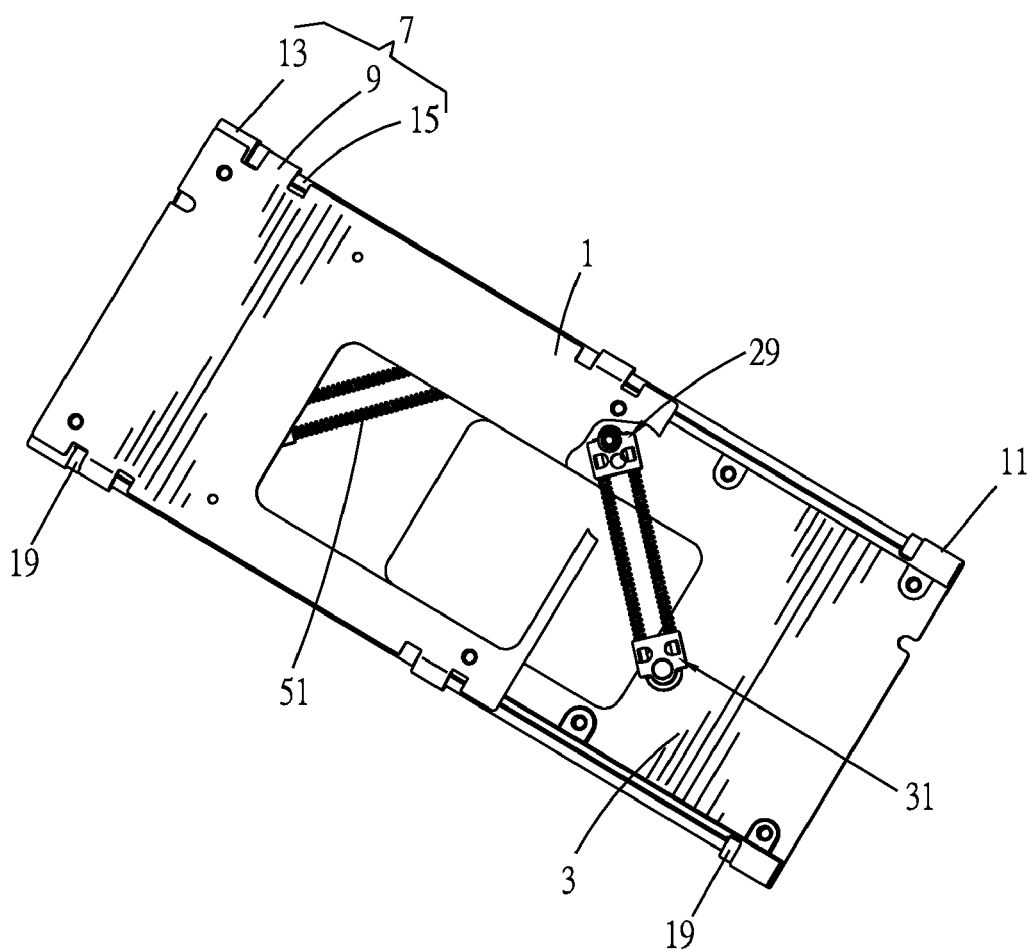
FIG. 2 is a perspective view showing the sliding device in a close situation.

Firstly referring to FIG. 1 and FIG. 2, a preferred embodiment of a sliding device 100 according to the present invention includes a main base 1, a sliding base 3 and an elastic module 5. A guiding portion 7 is coupled to the main base 1 and the sliding base 3, and arranged therebetween for guiding the sliding base 3 sliding on the main base 1 and limiting the sliding range of the sliding base 3 sliding on the main base 1. The guiding portion 7 includes a guiding arm 9 curved and projected outwardly from two opposite sides of the main base 1. At least two blocks 11, 13 are located in two opposite ends of the two opposite sides of the sliding base 3. A guiding bar 15 is arranged between the blocks 11, 13. Two ends of the guiding bar 15 are respectively fixed to the blocks 11, 13.

The blocks 11, 13 and the guiding bar 15 may be formed together at two opposite sides of the sliding base 3, rather than be assembled as shown in the figures. The exemplary assembly of the blocks 11, 13 and the guiding bar 15 is described in the following. The blocks 11, 13 include a guiding hole 17 respectively. The guiding holes 17 are opened to each other and mounted to the sliding base 3 in parallel. Both ends of the guiding bar 15 are respectively engaged and fixed in the guiding hole 17. When the main base 1 engages with the sliding base 3, the guiding bar 15 passes through a curve portion of the guiding arm 9.

Referring to FIG. 1 and FIG. 2, at least one cushion 19 is located in two opposite sides of the sliding base 3 and contacted to the blocks 11, 13. At least one fixing portion 21 is placed at two opposite sides of the sliding base 3 having at least two fixing walls 23, 25 projected outwardly from two opposite sides of the sliding base 3. A space 27 is formed between the two walls 23, 25. The guiding bar 15 is passed through the space 27 and fixed by the two fixing walls 23, 25 when the main base 1 engages with the sliding base 3.

Still referring to FIG. 1 and FIG. 2, two elastic modules 5 are arranged to V shape and configured between the main base 1 and the sliding base 3. Each elastic module 5 has a first rotator 29 and a second rotator 31 respectively rotated and coupled to the main base 1 and the sliding base 3. The first rotator 29 of the elastic module 5 is rotated and coupled to the sliding base 3. Otherwise, the second rotator 31 of the elastic module 5 is rotated and coupled to the main base 1 at the left side. At the right side, the first rotator 29 of the elastic module 5 is rotated and coupled to the main base 1. Further the second rotator 31 of the elastic module 5 is rotated and coupled to the sliding base 3.

At the left side, the first rotator 29 includes a first pivot portion 33 coupled to the first rotator 29 and the sliding base 3, and the second rotator 31 includes a second pivot portion 35 coupled to the second rotator 33 and the main base 1. The first rotator 29 is pivoted to the sliding base 3 by the first pivot portion 33, and the second rotator 31 is pivoted to the main base 1 by the second pivot portion 35.

The first pivot portion 33 includes a first through hole 37 perpendicularly mounted through the first rotator 29, a first fixed hole 39 mounted on the sliding base 3 and a first nail 41 passed through the first through hole 37 and fixed in the first fixed hole 39. Furthermore, the second pivot portion 35 comprises a second through hole 43 mounted through the second rotator 31 perpendicularly, a second fixed hole 45 mounted on the main base 1 and a second nail 47 passed through the second through hole 43 and fixed in the second fixed hole 45.

Particularly, a sliding bar 49 passes through a compression spring 51, which is arranged between the first rotator 29 and the second rotator 31. One end of the sliding bar 49 is fixed to an opening 53 transversely mounted in the first rotator 29, the other end of the sliding bar 49 is passed through a sliding opening 55 opening through the second rotator 31 in parallel.

Figure 3:
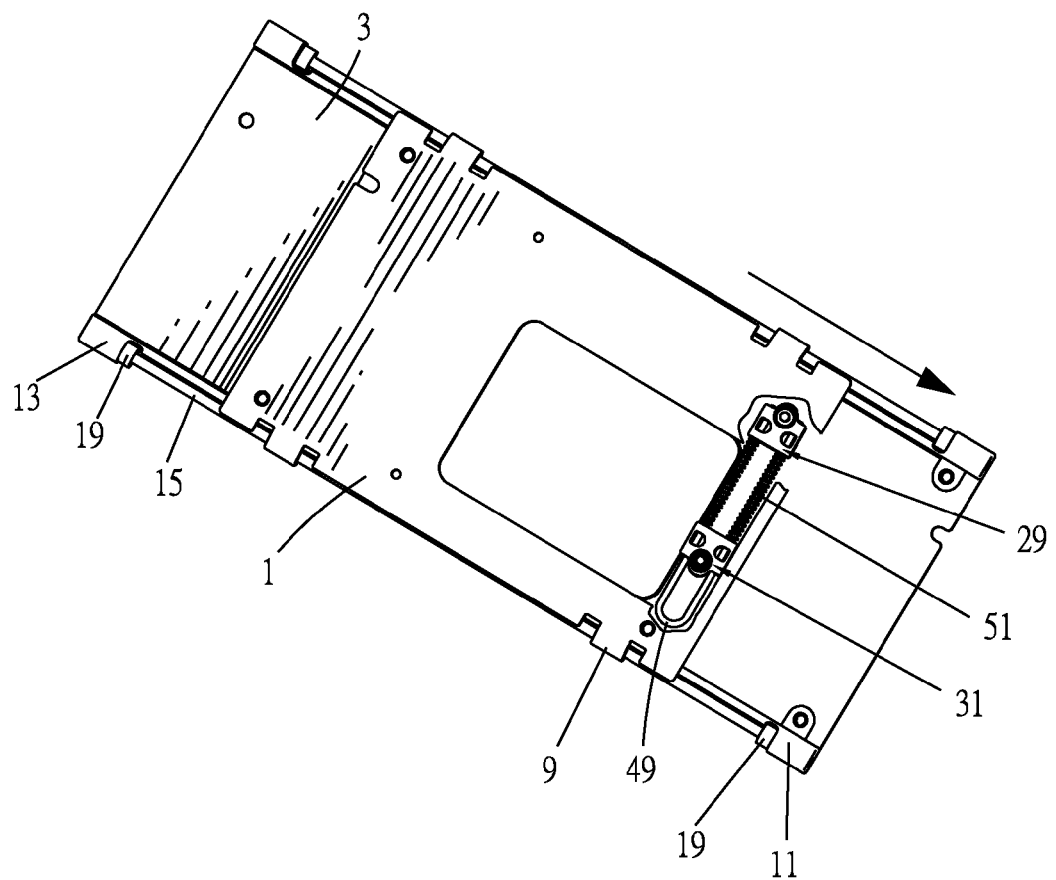
FIG. 3 is a perspective view showing the sliding device in a sliding situation.

Please refer to FIG. 2. When the sliding device 100 is in a completed close situation, the compression spring 51 is accumulated no sliding force and thus in a normal status. The guiding arm 9 contacts to the cushion 19. Referring to FIG. 3, when the sliding base 3 receives external force to slide on the main base 1, the sliding base 3 is guided to slide on the main base 1 by the guiding bar 15 of the sliding base 3 sliding along the guiding arm 9 of the main base 1. The first rotator 29 and the second rotator 31 at the right side are turning clockwise, otherwise, the first rotator 29 and the second rotator 31 at the left side are turning anti-clockwise.

In FIG. 3, when one end of the sliding bar 49 slides to the second rotator 25, a distance between the first rotator 23 and the second rotator 25 is getting close. In this case, the first rotator 23 and the second rotator 25 are pushing to both ends of the compression spring 51 respectively. So the compression spring 51 receives compression force from the first rotator 29 and the second rotator 31 and thus the sliding force is accumulated. When the sliding base 3 slides on the main base 1 to achieve a critical level, the distance between the first rotator 29 and the second rotator 31 is the shortest and the sliding force accumulated in the compression spring 51 is therefore maximized.

While the sliding base 3 slides on the main base 1 and over the critical level, the sliding base 2 is advanced to a completed open situation by the sliding force released from the compression spring 51. That is to say, the compression spring 51 is released sliding force to push the first rotator 29 and the second rotator 31. Therefore, one end of the sliding bar 49 slides back to the second rotator 31. So the first rotator 29 and the second rotator 31 is getting far away and thus the compression spring 51 returns to the normal status.

Figure 4:
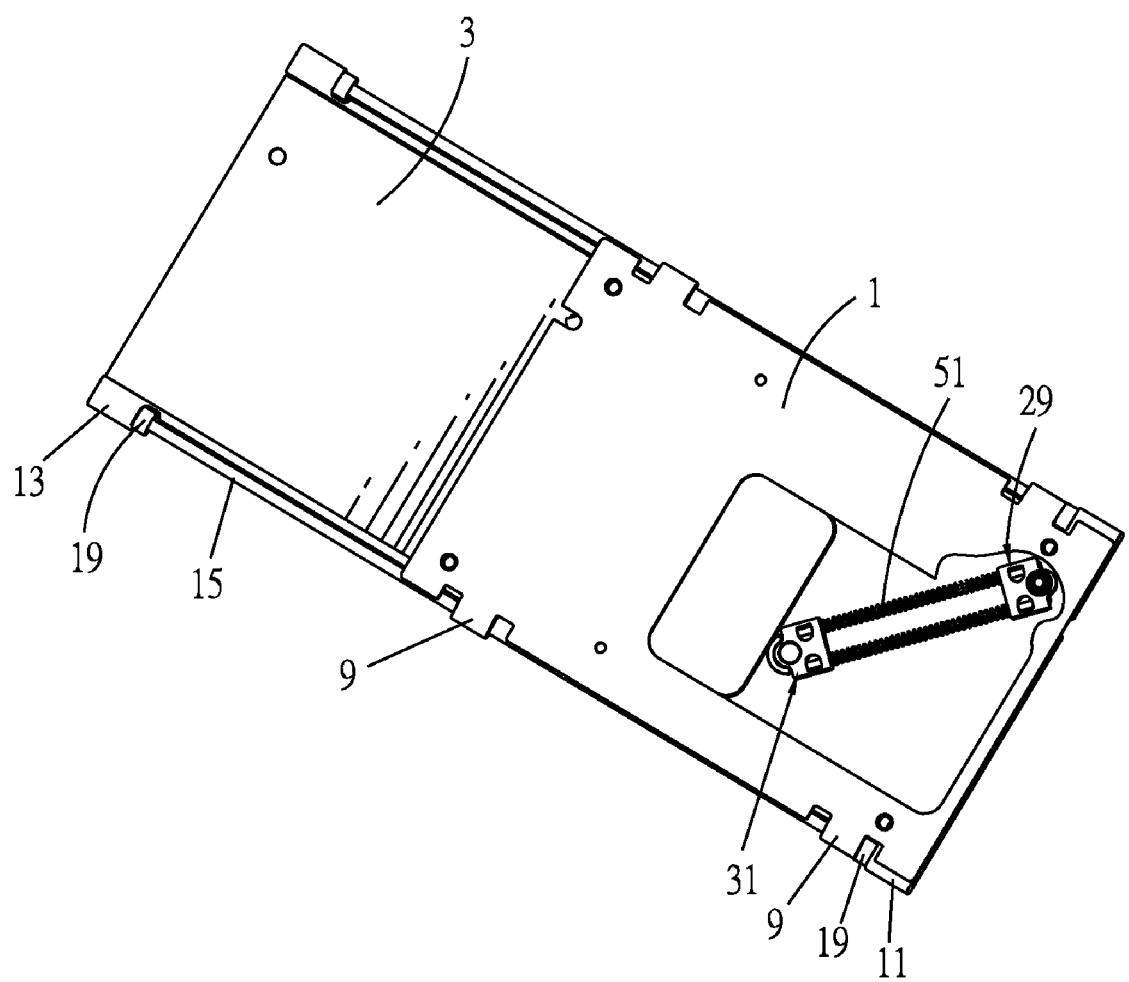
FIG. 4 is a perspective view showing the sliding device in an open situation.

As showing in FIG. 4, while the sliding base 3 slides on the main base 1 to a completed open status, the cushion 19 contacts the guiding arm 9. The blocks 11, 13 would block the sliding base 3 sliding on main base 1. In this case, the sliding range is limited to the location of the blocks 11, 13 arranged at the sliding base 3.

When the sliding base 3 slides to the completed close status by receiving external force, the compression spring 51 is still accumulated sliding force. While the sliding base 3 slides on the main base 1 to over the critical level, the sliding base 3 is advanced to the completed close situation by the sliding force released from the compression spring 51.

Figure 5:
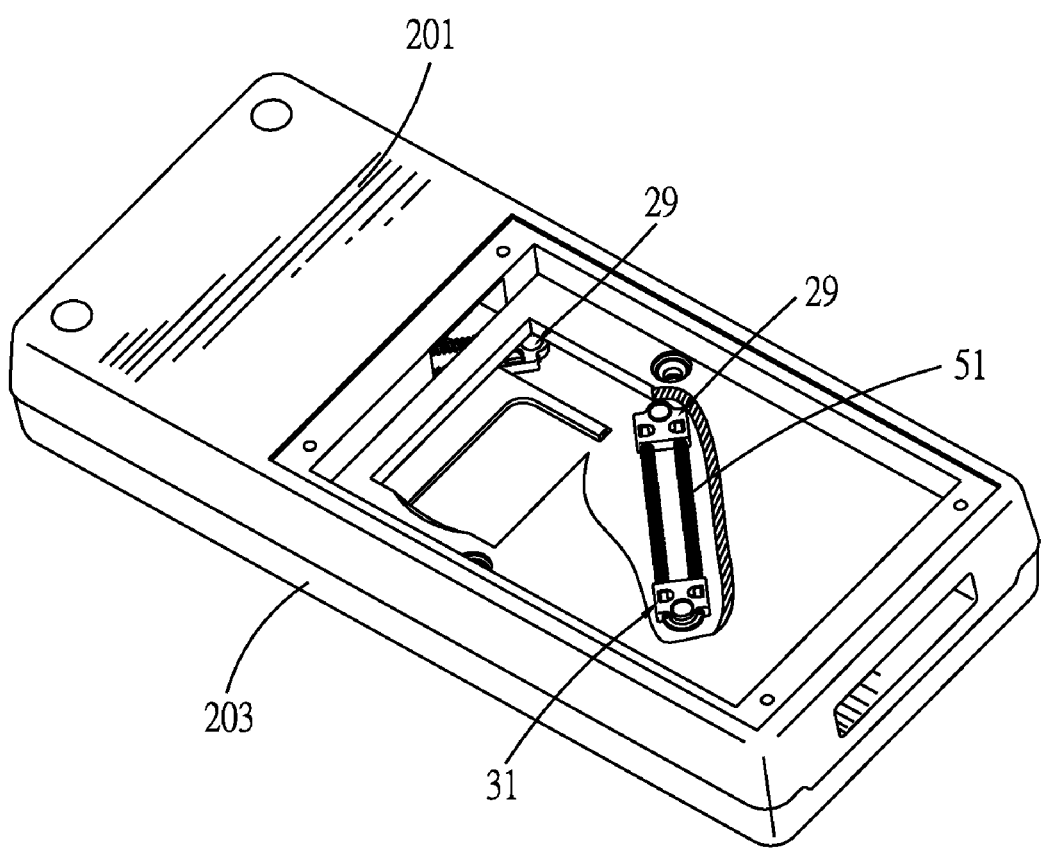
FIG. 5 is a perspective view showing the sliding device configured in a portable electrical apparatus in a close situation.
Figure 6:
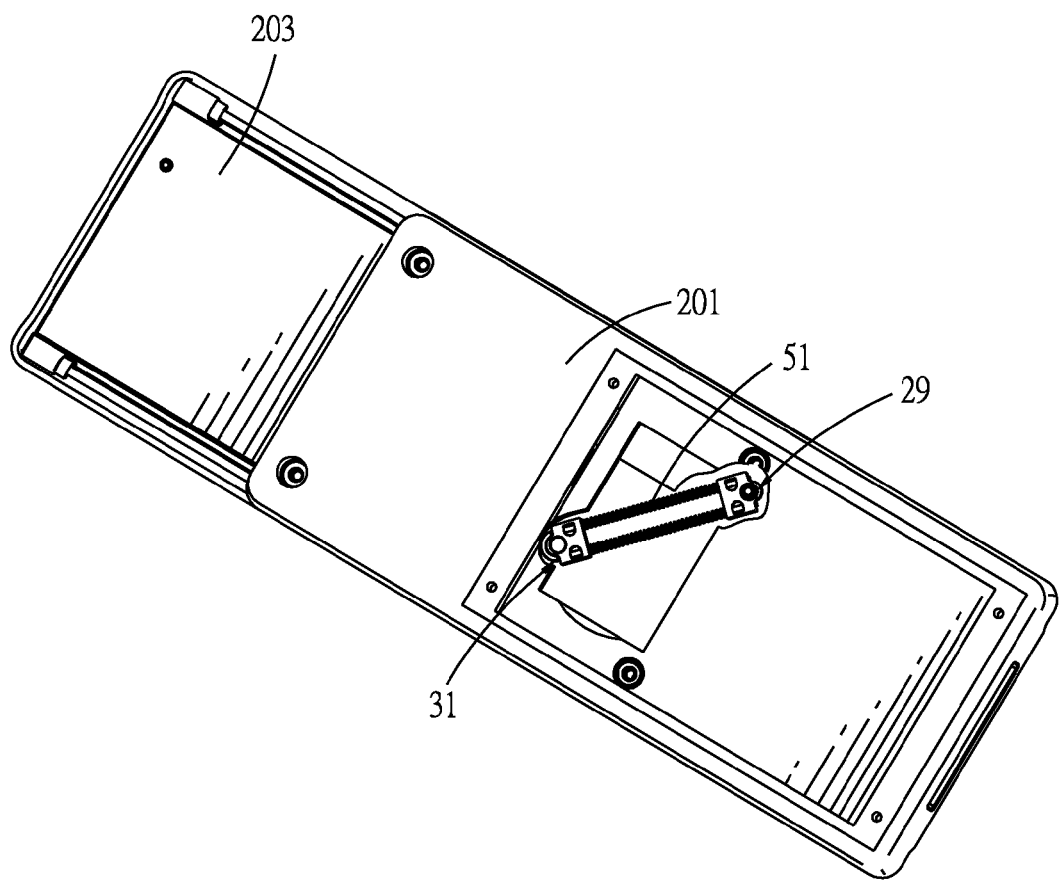
FIG. 6 is a perspective view showing the sliding device configured in the portable electrical apparatus in an open situation.

Please refer to FIG. 5 and FIG. 6. A portable electrical apparatus 200 includes a main housing 201 and a sub-housing 203. The sliding device 100 is configured between the main housing 201 and the sub-housing 203. The main base 1 of the sliding device 100 is fixed to a main housing 201 of the portable electrical apparatus 200 and the sliding base 3 of the sliding device 100 is fixed to the sub-housing 203 of the portable electrical apparatus 200. So the sub-housing 203 would slide above the main housing 201 to a completed open situation and a completed close situation because of the sliding base 3 capable of sliding on the main base 1 to the completed open situation and the completed close situation.

The operation of the sliding device 100 via the guiding portion 7 for limiting sliding range and guiding the sliding base 3 sliding on the main base 1, and the compression spring 51 accumulated sliding force from and released sliding force to the first rotator 29 and the second rotator 31. That is to say, structure of the sliding device 100 is simply because of operation of the sliding device 100 via cooperate the main base 1, the sliding base 3 and the elastic module 5. Furthermore, volume of the sliding device 100 is little because of the guiding portion 7 and the elastic module 5 are arranged between the main base 1 and the sliding base 3.

The foregoing description of various implementations has been presented for the purposes of illustration and description. It is not intended to be exhaustive or to limit the scope to the precise form disclosed. Many modifications and variations are possible in light of the above teaching. Such modifications and variations are intended to be included within the scope of this invention as defined by the accompanying claims.

What is claimed is:

1. A sliding device, comprising:
  a main base coupled to a main housing;
  a sliding base coupled to a sub-housing;
  a guiding portion coupled to said main base and said sliding base for determining a sliding range of said sliding base sliding on said main base; and
  an elastic module arranged between said main base and said sliding base for providing sliding force, a first rotator and a second rotator coupled to said sliding base and said main base respectively, a sliding bar arranged between said first rotator and said second rotator, one end of said sliding bar fixed to said first rotator, other end of said sliding bar engaged with said second rotator, a compression spring surrounding said sliding bar, wherein while said sub-housing sliding on said main housing to achieve a critical level, a distance between said first rotator and said second rotator is shortest and said sliding force accumulated in said compression spring is maximized.

2. The sliding device as claimed in claim 1, wherein said guiding portion comprises two blocks arranged at two opposite ends of two opposite sides of said sliding base, a guiding bar arranged between said blocks and both two opposite ends fixed to said blocks respectively, at least one guiding arm projected outwardly from said two opposite side, said guiding bar passed through a curve portion of the guiding arm.

3. The sliding device as claimed in claim 2, further comprising a fixing portion arranged at two opposite sides of said sliding base comprising at least two walls projected outwardly from two opposite sides of said sliding base and a space formed between said two walls, said guiding bar passed through said space.

4. The sliding device as claimed in claim 2, further comprising a cushion arranged at two opposite sides of said sliding base and contacted to said blocks.

5. The sliding device as claimed in claim 1, wherein said first rotator comprises a first pivot portion coupled to said first rotator and said sliding base, said second rotator comprises a second pivot portion coupled to said second rotator and said main base, said first rotator pivoted to said sliding base by said first pivot portion, said second rotator pivoted to said main base by said second pivot portion.

6. The sliding device as claimed in claim 5, wherein said first pivot portion comprises a first through hole perpendicularly mounted through said first rotator, a first fixed hole mounted on said sliding base, a first nail passed through said first through hole and fixed to said first fixed hole, said second pivot portion comprises a second through hole perpendicularly mounted through said second rotator, a second fixed hole mounted on said main base, a second nail passed through said second through hole and fixed to said second fixed hole.

7. The sliding device as claimed in claim 1, wherein said first rotator comprises an opening transversely mounted therein, said second rotator comprises a sliding opening transversely mounted through therein, one end of said sliding bar fixed to said opening, other end of said sliding bar pass through said sliding opening and sliding to said second rotator.

* * * * *